(12) United States Patent
Chung et al.

(10) Patent No.: US 9,161,321 B2
(45) Date of Patent: Oct. 13, 2015

(54) METHOD AND APPARATUS PROVIDING SIGNAL METRIC FOR TRANSMITTER

(75) Inventors: Pei-Shiun Chung, New Taipei (TW); Qian-Zhi Huang, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 204 days.

(21) Appl. No.: 13/113,311

(22) Filed: May 23, 2011

(65) Prior Publication Data

US 2012/0069885 A1 Mar. 22, 2012

(51) Int. Cl.
*H04W 52/18* (2009.01)
*H04W 52/52* (2009.01)
*H04W 52/16* (2009.01)

(52) U.S. Cl.
CPC .............. *H04W 52/52* (2013.01); *H04W 52/16* (2013.01); *H04W 52/18* (2013.01)

(58) Field of Classification Search
CPC ... H04W 52/00; H04W 52/04; H04W 52/246; H04W 52/18; H04W 52/248
USPC ................. 375/224, 228, 259–261, 295, 298; 455/13.4, 127.5, 127.1, 574
See application file for complete search history.

(56) References Cited

U.S. PATENT DOCUMENTS

| | | | | |
|---|---|---|---|---|
| 3,903,401 A | * | 9/1975 | Jayant | 702/76 |
| 6,522,869 B1 | * | 2/2003 | Hiramatsu et al. | 455/127.2 |
| 6,856,644 B1 | * | 2/2005 | Wang et al. | 375/130 |
| 7,269,205 B2 | * | 9/2007 | Wang | 375/148 |
| 7,349,504 B2 | * | 3/2008 | Li et al. | 375/346 |
| 8,284,824 B1 | * | 10/2012 | Smaini et al. | 375/221 |
| 2002/0012403 A1 | * | 1/2002 | McGowan et al. | 375/295 |
| 2003/0045318 A1 | * | 3/2003 | Subrahmanya | 455/522 |
| 2005/0262421 A1 | * | 11/2005 | Tran et al. | 714/758 |
| 2008/0192706 A1 | * | 8/2008 | Yano et al. | 370/335 |
| 2010/0153049 A1 | | 6/2010 | Ventola et al. | |
| 2010/0269013 A1 | * | 10/2010 | Choi et al. | 714/755 |
| 2011/0026430 A1 | * | 2/2011 | Kim et al. | 370/253 |
| 2011/0222416 A1 | * | 9/2011 | Damnjanovic et al. | 370/252 |
| 2012/0017188 A1 | * | 1/2012 | Lepak et al. | 716/109 |
| 2012/0082197 A1 | * | 4/2012 | Jonsson et al. | 375/224 |

FOREIGN PATENT DOCUMENTS

| | | |
|---|---|---|
| CN | 101180790 A | 5/2008 |
| TW | 201101897 A1 | 1/2011 |

* cited by examiner

*Primary Examiner* — Jean B Corrielus
(74) *Attorney, Agent, or Firm* — McClure, Qualey & Rodack, LLP (57) ABSTRACT

The present invention provides a method and associated apparatus providing a signal metric for a transmitter of a communication system including: accumulating a plurality of power terms, each power term corresponding to a product of one of symbol amplitudes and one of scaling factors; and calculating the signal metric according to the accumulated power terms.

24 Claims, 6 Drawing Sheets

FIG. 1

| $A(i) : rI(j) = aI(i, ch1)*bt(i, ch1) + aI(i, ch2)*bt(i, ch2)$ |
|---|
| $aI(i, ch1) \in \{1,3\};$ |
| $aI(i, ch2) \in \{1,3\};$ |
| $bt(i, ch1) = bt\_ch1;$ |
| $bt(i, ch2) \in \{bt\_ch2, -bt\_ch2\}$ |
| $A(0) : rI(0) = 1*bt\_ch1 + 1*bt\_ch2$ |
| $A(1) : rI(1) = 1*bt\_ch1 - 1*bt\_ch2$ |
| $A(2) : rI(2) = 3*bt\_ch1 + 1*bt\_ch2$ |
| $A(3) : rI(3) = 3*bt\_ch1 - 1*bt\_ch2$ |
| $A(4) : rI(4) = 1*bt\_ch1 + 3*bt\_ch2$ |
| $A(5) : rI(5) = 1*bt\_ch1 - 3*bt\_ch2$ |
| $A(6) : rI(6) = 3*bt\_ch1 + 3*bt\_ch2$ |
| $A(7) : rI(7) = 3*bt\_ch1 - 3*bt\_ch2$ |

METHOD AND APPARATUS PROVIDING SIGNAL METRIC FOR TRANSMITTER

FIELD OF THE INVENTION

The present invention relates to a method and apparatus providing a signal metric for a transmitter of a communication system, and more particularly, to a method and apparatus providing signal metric of nonlinearity with reduced computation complexity.

BACKGROUND OF THE INVENTION

Communication systems, especially wireless communication systems, have become an important portion of modern society. Generally speaking, in a wireless communication system, a base station (e.g., NodeB) establishes radio coverage over a cell, and a terminal (e.g., UE, user equipment) can therefore communicate with the base station by signal transmission through a wireless communication channel between the base station and the terminal. By different communication parameter combinations such as combinations of different modulation schemes and/or coding schemes, the communication channel, involving medium and environment where wireless signals propagate, can be separated to a plurality of physical channels for multiple-access. Some of the physical channels implement downlink channels for transmission from the base station to the terminal; others are allocated as uplink channels for transmission from the terminal to the base station. From another aspect, some of the physical channels are used for data transmission, and others are used for transmission of control information which is used for initiating, managing, handover and/or ending of the communication channel.

In wireless communication systems, the terminal is equipped with a transmitter for forming and sending uplink signals to the base station; in the transmitter, a power amplifier (PA) is adopted for signal transmission. The Peak-to-Average Power Ratio (PAPR) of transmitted waveform limits the maximum transmitted power due to the linearity of the power amplifier. For example, in the third generation (3G) wideband code division multiple access (WCDMA) standard, higher data rates are supported in the uplink direction through the technique of multi-code transmission. Uplink channels such as four E-DPDCHs (Enhanced-Dedicated Physical Data CHannels), one E-DPCCH (Enhanced-Dedicated Physical Control CHannels), one DPCCH (Dedicated Physical Control CHannels), and one HS-DPCCH (High-Speed-Dedicated Physical Control CHannels) can be simultaneously established in the Release 6 specification, and it is known that it leads to higher PAPR, and therefore larger linear range of PA is required to achieve the same root-mean-square (RMS) power since more complicated amplitude modulation schemes are adopted. One way to prevent the higher requirement of PA's linearity is to reduce the requirement of maximum transmitted power for keeping reasonable cost and power consumption at the terminal. Moreover, if the transmitted power exceeds the maximum power with linear characteristic, the nonlinear distortion will appear and form a source of interference for the in-band and out-of-band. In the 3rd Generation Partnership Project (3GPP) technical specification 25.101, a cubic metric (CM) is then defined to determine the amount of 3rd-order inter-modulation distortion and to approximate the PAPR of transmitted signals. Based on the value of CM, the maximum power reduction (MPR) can be determined and the maximum transmitted power can be reduced by a back-off of MPR to minimize the nonlinear effect. Hence, by changing the maximum power dynamically, the PA's linear range can be fully utilized regardless of physical channel configurations and the characteristic of PAPR. The formulas of CM and MPR are:

$$v = rI + j*rQ, v_{norm} = v/|v| \quad (eq1)$$

$$CM\_unq = c1 * 20 \cdot \log_{10}((v_{norm}^3)_{rms}) + c2$$

$$CM = CEIL_{0.5dB}(c1 * 20 \cdot \log_{10}((v_{norm}^3)_{rms}) + c2) \quad (eq2)$$

$$MPR = \max(CM - 1, 0) \quad (eq3)$$

$$MPR\_unq = \max(CM\_unq - 1, 0)$$

where the term v is the transmitted waveform after spreading, scaling by scaling factors, IQ mapping, scrambling, and pulse-shaping filtering; the term CM_unq is an un-quantized CM, and the term MPR_unq is an un-quantized MPR. The term $v_{norm}$ is the normalized version of the waveform v; the function |x| is the absolute value of x; the function $(\bullet)_{rms}$ is the root-mean-square value of the input argument; and the terms c1 and c2 are two constant depending on the physical channel configuration, including number of physical channels (Nphch), spreading factor, channelization codes, etc. The two constants c1 and c2 also depend on the CM normalization based on the reference waveform. The ceiling function $CEIL_{0.5dB}()$ rounds the input argument upwards to the closest multiplication of 0.5 dB.

MPR will be used for the transmitted power control to determine the allowed maximum power. That is, MPR must be calculated before the generation of waveform and highly depends on the physical channel configurations. In 3GPP, the channel configuration could be changed twice per slot (a slot is a predetermined time interval) and thus available processing time of MPR is limited. The CM calculation has to predict the actual CM before forming of the transmitting waveform, and it has to work under tight timing limitation. Another difficulty is that the calculation involves cubic operations and it involves the high dynamic range in the fixed-point implementation.

SUMMARY OF THE INVENTION

Therefore, the present invention relates to method and apparatus providing/calculating a signal metric, such as CM, for transmitter.

One objective of the invention is to provide a method providing a signal metric for a transmitter; the transmitter transmits a signal with amplitudes scaled by scaling combinations selected from a plurality of scaling combination alternatives, and the method includes: providing a plurality of power terms, each power term (e.g., power term A(i)) corresponding to one of the scaling combination alternatives; and calculating the signal metric according to the plurality of power terms.

In an embodiment, the signal carries a first phase portion (e.g., an in-phase portion) and a second phase portion (e.g., a quadrature-phase portion) of different phases; and the method further includes: for each power term A(i), providing a corresponding first phase component rI(i) and a corresponding second phase component rQ(i) respectively in association with the first phase portion and the second phase portion; and providing each of the power terms according to rI(i)^2 and rQ(i)^2, i.e., a sum of a square of the corresponding first phase component and a square of the corresponding second phase component.

In an embodiment, the first phase portion can carry a first number of first channels (with each first channel indexed by an index x) and the second phase portion can carry a second number of second channels (with each second channel indexed by an index y); and the method further includes: for each power term A(i), providing a first number of corresponding first channel components al(i,x)*bt(x) respectively in association with the first number of first channels, and providing a second number of corresponding second channel components al(i,y)*bt(y) respectively in association with the second number of second channels; and providing the corresponding first phase component rI(i) according to a sum of the corresponding first number of first channel components al(i,x)*bt(x), and providing the corresponding second phase component rQ(i) according to a sum of the corresponding second number of second channel components al(i,y)*bt(y).

In an embodiment, each of the first channels and the second channels carries symbols, each of the symbols is carried by a symbol amplitude al(•,•) selected from a plurality of corresponding symbol amplitude alternatives; and the method further includes: for each power term A(i), providing each first channel component al(i,x)*bt(x) and each second channel component al(i,y)*bt(y) according to a multiplication of one of the corresponding plurality of symbol amplitude alternatives.

In an embodiment, each of the first number of first channels is carried (scaled) by a corresponding first scaling factor bt(x) selected from a plurality of corresponding first scaling factor alternatives, and each of the second number of second channels is carried by a corresponding second scaling factor bt(y) selected from a plurality of corresponding second scaling factor alternatives; and the method further includes: for each power term A(i), providing each of the first number of first channel components al(i,x)*bt(x) according to a multiplication of one of the corresponding first scaling factor alternatives, and providing each of the second number of second channel components al(i,y)*bt(y) according to a multiplication of one of the corresponding second scaling factor alternatives.

In an embodiment, the signal metric according to a sum of n-th power of each power term A(i) and n-th power of a sum of the power terms A(i). For CM calculation, n can be set to 3.

In an embodiment, the signal metric can be further weighted by an adjusting gain and/or be offset by an adjusting offset; the adjusting gain and/or adjusting offset can be determined according to configuration of the channels and/or communication parameter selected for communication.

One objective of the invention is to provide an apparatus providing a signal metric for a transmitter; including an accumulation module providing a first phase component and a second phase component for a power term A(i) corresponding to one of the scaling combination alternatives, and a calculation unit obtaining the power term A(i) according to the first phase component and the second phase component and further calculating the signal metric according to the plurality of power terms.

The accumulation module includes a first phase module and a second phase module respectively provide a first phase component rI(i) and a second phase component rQ(i) for each power term A(i). The calculation unit obtains each power term A(i) according to a sum of a square of the first phase component rI(i) and a square of the second phase component rQ(i).

For each power term A(i), the first phase module provides first channel component(s) al(i,x)*bt(x) respectively in association with the first channel(s), and provides the first phase component rI(i) according to a sum of the first channel component(s) al(i,x)*bt(x); the second phase module provides second channel component(s) al(i,y)*bt(y) respectively in association with the second channel(s), and provides the second phase component rQ(i) according to a sum of the second channel component(s) al(i,y)*bt(y);

In an embodiment, the apparatus further includes a mapping unit weighting the signal metric by an adjusting gain and/or offsetting the signal metric by an adjusting offset.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
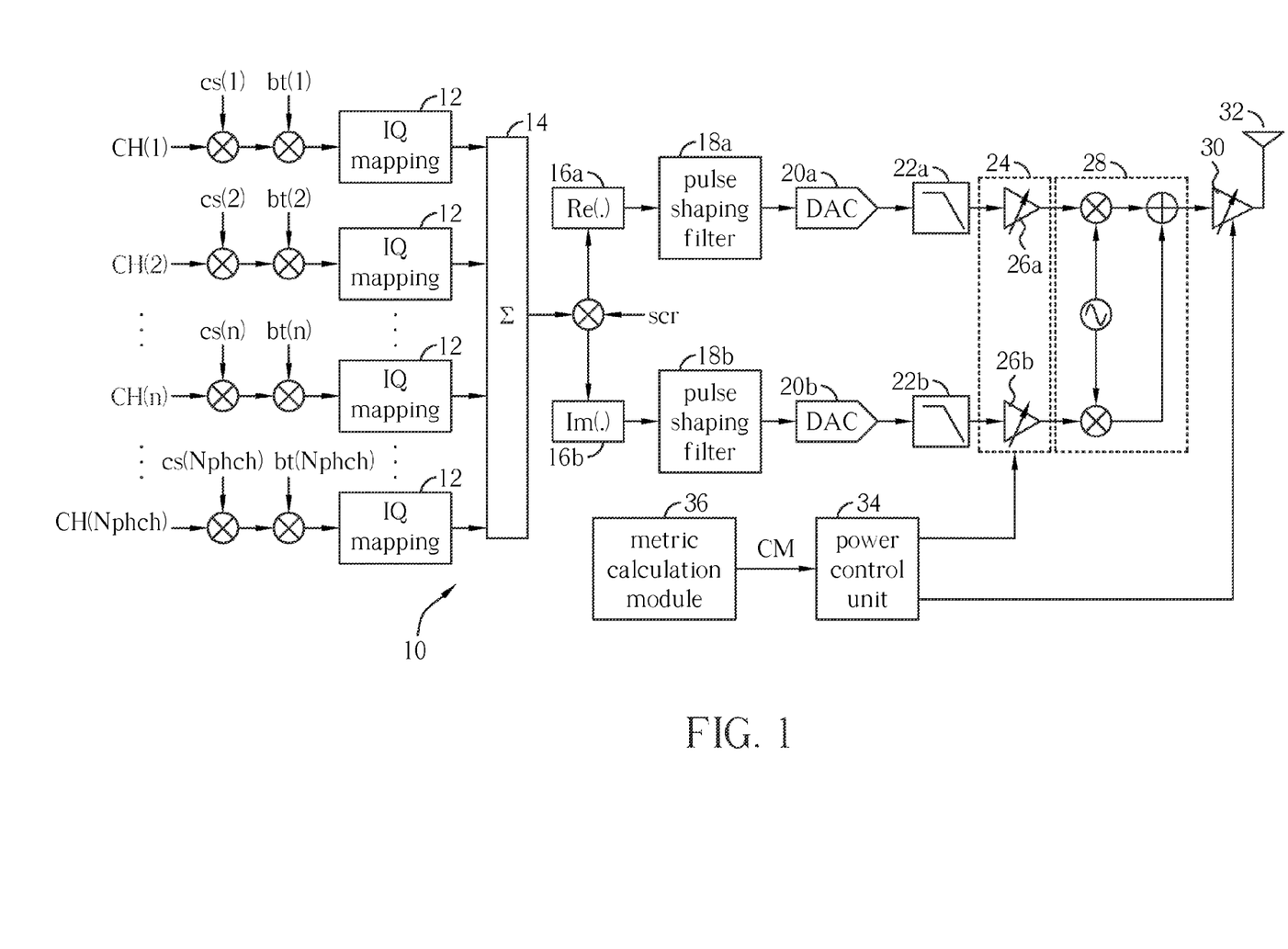
FIG. 1 illustrates a transmitter according to an embodiment of the invention.

Please refer to FIG. 1 illustrating a transmitter 10 according to an embodiment of the invention. The transmitter 10 can be applied to a terminal of a wireless communication system, such as a UE of a mobile communication system following standard/specification of 3GPP. Bits of data and/or information to be transmitted by the transmitter 10 are organized into blocks (e.g., transport blocks); then the blocks can be arranged into one or multiple channels (e.g., physical channels), such as channels CH(1), CH(2), . . . , CH(n) to CH(Nphch). For example, these channels can respectively be a DPDCH, a DPCCH, an HS-DPCCH, an E-DPCCH, and four E-DPDCHs. Bits of each channel CH(n) are multiplied by a corresponding channelization code cs(n) for spreading, scaled by a corresponding scaling factor bt(n), and then mapped to an in-phase portion and/or a quadrature-phase portion through an IQ mapping 12; the IQ mapped result is often expressed as a complex number with a real part (corresponding to in-phase portion) and an imaginary part (corresponding to quadrature-phase portion). The channelization codes of different channels can be different; the scaling factors of different channels can be different or the same. Number of the channels (i.e., Nphch) can be configured to be different according to different application scenarios. For example, to support basic WCDMA functionality, two channels DPDCH and DPCCH are allocated; to support advanced HSDPA (High Speed Downlink Packet Access), three channels DPDCH, DPCCH and HS-DPCCH can be simultaneously utilized. For application adopting HSDPA and the more advanced HSUPA (High Speed Uplink Packet Access), five to seven channels can be established, including a DPDCH, a DPCCH, an HS-DPCCH, an E-DPCCH and one to four E-DPDCH(s). Different application scenarios can switch e.g., slot by slot.

IQ mapped results of the channels CH(1) to CH(Nphch) are then superposed by an adder 14; the sum is then scrambled by a scramble code scr (e.g., a complex scramble code), and is further decomposed to a real part and an imaginary part respectively by a real part extractor 16a and an imaginary part extractor 16b. A pulse shaping filter 18a forms a digital waveform for transmitting the real part, and another pulse shaping filter 18b forms another digital waveform for transmitting the imaginary part. The digital waveforms of the real part and the imaginary part are respectively converted to corresponding analog waveforms by two DACs (Digital to Analog converters) 20a and 20b. The resultant analog waveforms are then respectively filtered by two low-pass filters 22a and 22b, and are respectively amplified by two controllable amplifier 26a and 26b of an amplifier module 24. Then an up-converter 28 modulates the two amplified waveforms into a modulated signal by proper phase and carrier frequency. The modulated signal, carrying symbols which represent bits to be transmitted, is amplifier by a controllable PA 30, and then transmitted to air through an antenna 32.

The PA 30 sets appropriate signal power level to guarantee the signal strength for correct reception of the base station. To confine the amplitude of the modulated signal to the linear range of the PA 30, the transmitter 10 also includes a metric calculation module 36 and a power control unit 34. The power control unit 34 determines the actual transmitted power by distributing the gain setting before and after the up-converter 28.

The multi-code transmission provides higher data rates, but it means that the achievable RMS power in the terminal shall be smaller if the physical channel configuration with larger PAPR is applied. The terminal 10 needs to guarantee that the peak power does not induce nonlinear distortion of the PA 30. For proper power control, the power control unit 34 determines the maximum power reduction (compared to the maximum power of a reference waveform) according to the physical channel configuration and/or the CM provided by the metric calculation module 36.

The cubic metric calculation module 36 provides the functionality of predicting the MPR before the transmitted signal (e.g., the analog waveforms of the DACs 22a and 22b) is generated. According to the equations eq1 and eq2, one way to calculate the cubic metric CM is to generate the temporal waveform v operating at multiples of chip rate to characterize the effect of pulsing shaping filters 18a and 18b, and to calculate the root-mean-square of the waveform v by numerical temporal integration. But the calculation is timing-consuming and of high computational complexity.

Instead of calculating CM by temporal waveform of the signal to be transmitted, the invention computes CM according to stochastic expectation over all amplitude alternatives of the signal. Since the signal to be transmitted (denoted as ve hereinafter) will be modulated by sinusoidal carrier, amplitude (e.g., peak amplitude of signal envelope) of the signal ve dominates its root-mean-square. At any given moment (e.g., during a period transmitting a single symbol) of a given application scenario, the signal ve carries one or multiple simultaneous symbols respectively corresponding to one or multiple different co-existing channels, so the amplitude of the signal ve can be determined according to simultaneous symbol(s) of co-existing channel(s), where each symbol has a symbol amplitude scaled by the scaling factor of the corresponding channel. For each symbol, the symbol amplitude is selected from a plurality of symbol amplitude alternatives for constellation mapping according to value of the symbol, and the scaling factor is selected from a plurality of scaling factor alternatives according to channel configuration.

The symbol amplitude alternatives of simultaneous symbol(s) and the scaling factor alternatives of co-existing channel(s) combine to form scaling combination alternatives. A power term is then defined to represent amplitude of the signal ve under one of the scaling combination alternatives:

$$A(i) = \left\{ rI^2(i) + rQ^2(i) \mid rI(i) = \sum_{x \in I} aI(i, x) * bt(x); rQ(i) = \sum_{y \in Q} aI(i, y) * bt(y) \right\};$$

where the index i enumerates one of the scaling combination alternatives collectively combining the symbol amplitude alternatives and the scaling factor alternatives. The terms rI(i) and rQ(i) are two phase terms respectively corresponding to the in-phase portion and quadrature-phase portion of the signal ve. The index x indicates each of the simultaneous (co-existing) channel(s) carried by the in-phase portion, and the index y indicates each of the co-existing channel(s) carried by the quadrature-phase portion. The term al(i,x) (or al(i,y)) represents a symbol amplitude selected from symbol amplitude alternatives corresponding to the channel indexed by x (or y); the term bt(x) (or bt(y)) is a scaling factor selected from scaling factor alternatives corresponding to the channel indexed by x (or y), and the product al(i,x)*bt(x) (or al(i,y) *bt(y)) becomes a channel term corresponding to one of simultaneous channels.

Figure 2:
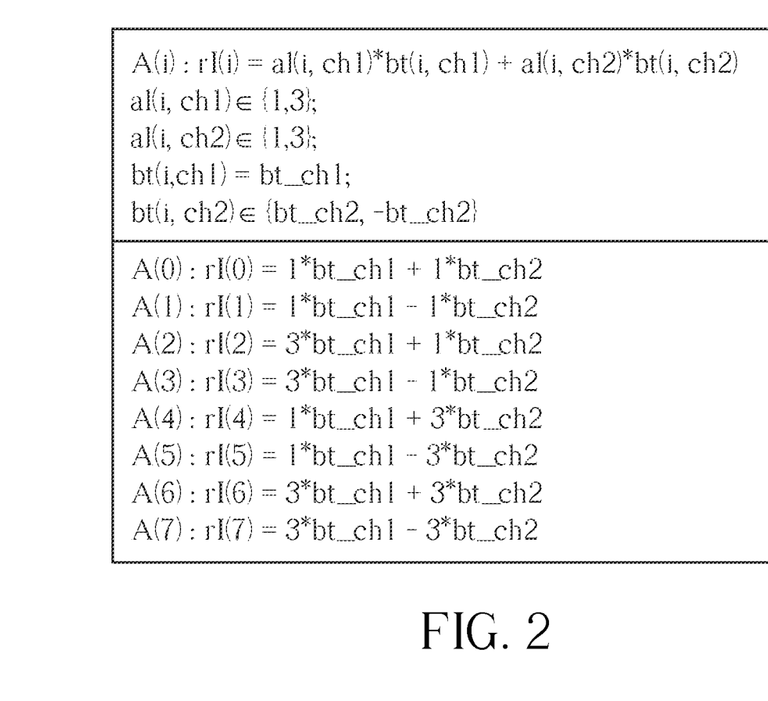
FIG. 2 demonstrates power terms according to an embodiment of the invention.

Please refer to FIG. 2 for an example of the power terms. Assuming there are two channels (indexed by ch1 and ch2) carried by in-phase and no channel of quadrature-phase, so the phase term rI(i) sums two channel terms al(i,ch1)*bt(ch1) and al(i,ch2)*bt(ch2), and the phase term rQ(i) vanishes. In the example of FIG. 2, each of the symbol amplitudes al(i, ch1) and al(i,ch2) is selected from alternatives $\{1, 3\}$, and the scaling factor bt(ch2) is selected from alternatives $\{bt\_ch2, -bt\_ch2\}$. Therefore there are eight power terms A(0) to A(7) covering all alternatives of the terms al(i,ch1), al(i,ch2) and bt(ch2).

More generally, for QPSK (Quadrature Phase-Shift Keying) modulation which is equivalent to BPSK (Binary Phase-Shift Keying) in each of the in-phase branch and quadrature-phase branch, the corresponding symbol amplitude for constellation mapping is selected from two alternatives $\{1, -1\}$. For 16-QAM (Quadrature Amplitude Modulation) equivalent to 4-PAM (Pulse Amplitude Modulation) in each of the in-phase and quadrature-phase branches, the symbol amplitude spans four alternatives $\{1, -1, 3, -3\}$. For 64-QAM with 8-PAM in each of the in-phase and quadrature-phase branches, the symbol amplitude has eight alternatives $\{1, -1, 3, -3, 5, -5, 7, -7\}$. For some channels, the scaling factor spans two alternatives: a positive value and a negative value. Since number of alternatives for symbol amplitude and for scaling factor is a power of 2, number of the power terms is also a power of 2. For example, if there are 3 and 4 channels with non-zero scaling factors respectively in in-phase and quadrature branches and all channels are transmitted using BPSK, then the number of the power terms will be 32, A(0) to A(31).

With power terms which cover all possibility of signal amplitude, the CM can be obtained according to a signal metric M3, which estimates third-order distortion of the signal ve by:

$$M3 = 20 \cdot \log_{10}((ve_{norm}^3)_{rms})$$

$$= 10 \cdot \log_{10}\left(\frac{E[(rI^2 + rQ^2)^3]}{(E[rI^2 + rQ^2])^3}\right)$$

$$= 10 \cdot \log_{10}(E[(rI^2 + rQ^2)^3]) - 10 \cdot \log_{10}((E[rI^2 + rQ^2])^3)$$

$$= 10 \cdot \log_{10}\left(\frac{1}{2^K}\sum_{i=0}^{2^K-1} A(i)^3\right) - 10 \cdot \log_{10}\left(\left(\frac{1}{2^K}\sum_{i=0}^{2^K-1} A(i)\right)^3\right),$$

where K-th power of 2 is total number of the power terms; the function E[•] gives stochastic expectation, which can be evaluated according to power terms A(i). For example, the third power of the sum of the square of the in-phase portion rI and the square of the quadrature-phase portion rQ can be evaluated by an average of third power of each power terms A(i). Notice the CM can then be obtained by the metric M3 through the equation eq2. That is, the CM (and therefore the MPR) can be handily obtained without numerical temporal integration of waveform root-mean-square.

Figure 3:
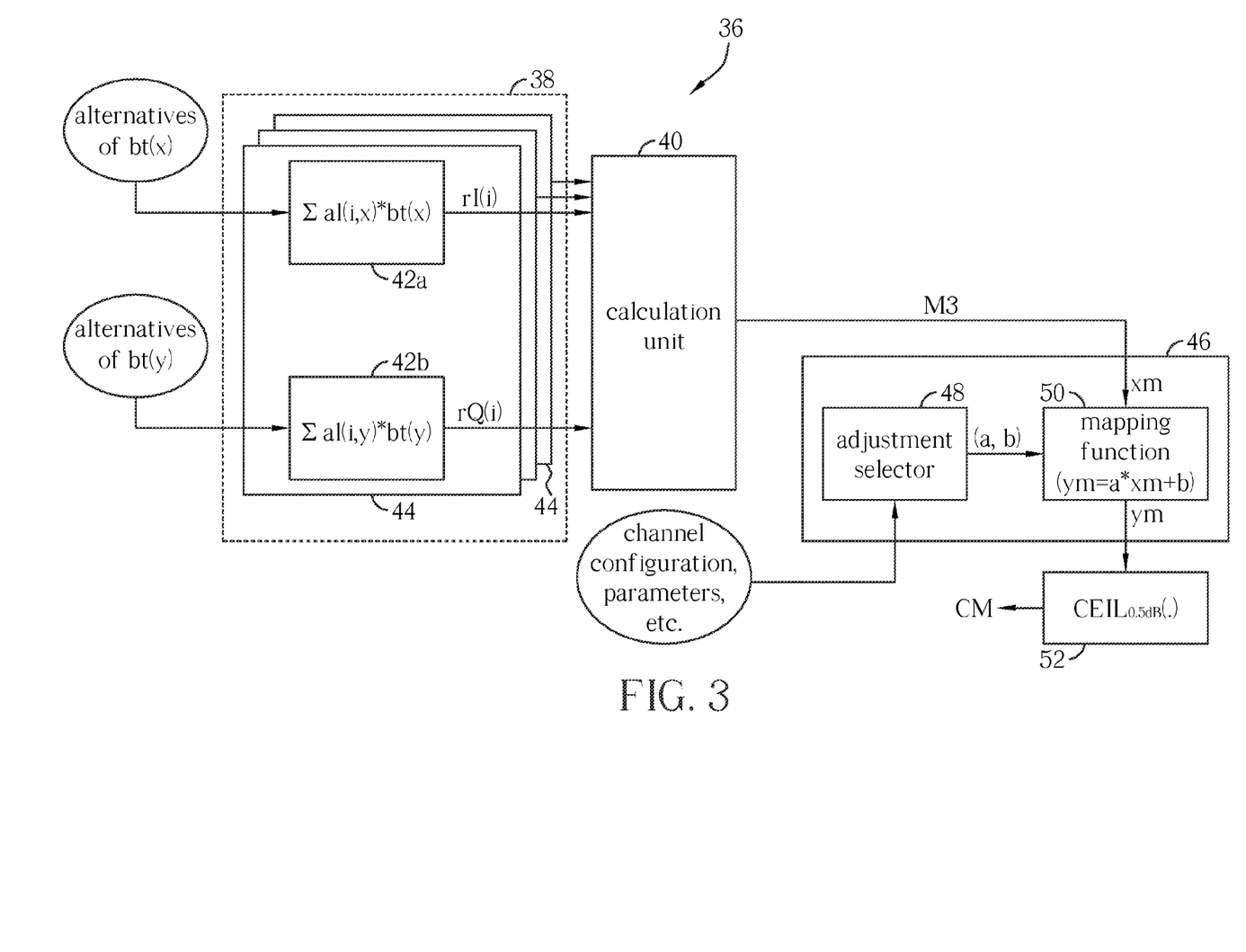
FIG. 3 illustrates the metric calculation module of FIG. 1 according to an embodiment of the invention.

Please refer to FIG. 3 illustrating the metric calculation module 36 according to an embodiment of the invention. The metric calculation module 36 includes an accumulation module 38, a calculation unit 40 and a mapping unit 46. The accumulation module 38 includes a plurality of power term modules 44, each power term module 44 corresponds to one of the power terms A(i) and includes two phase term accumulators 42a and 42b; the phase term accumulator 42a corresponds to the in-phase branch and generates the phase term rI(i) by accumulating channel terms al(i,x)*bt(x) corresponding to co-existing channel(s) of the in-phase branch; similarly, the phase term accumulator 42b corresponds to the quadrature-phase branch and generates the phase term rQ(i) by accumulating channel terms al(i,y)*bt(y) corresponding to co-existing channel(s) of the quadrature-phase branch. The phase term accumulators 42a of the power term modules 44 form a phase term module providing the phase term rI(i) for each power term A(i), and the phase term accumulators 42b of the power term modules 44 form another phase term module providing the phase term rQ(i) for each power term A(i). According to the phase terms rI(i) and rQ(i) of each power term A(i), the calculation unit 40 calculates the power terms A(i) and the signal metric M3.

The metric M3 can be further adjusted to obtain the CM. The mapping unit 46 applies a mapping function 50 to the metric M3; in the embodiment shown in FIG. 3, the mapping function 50 implements a linear mapping which maps an input xm to a corresponding output ym by ym=a*xm+b with an adjustment a being an adjusting gain and the adjustment b being an adjusting offset. The output of the mapping function 50 is then quantized by a quantization unit 52, which implements the ceiling function of the equation eq2.

Figure 4:
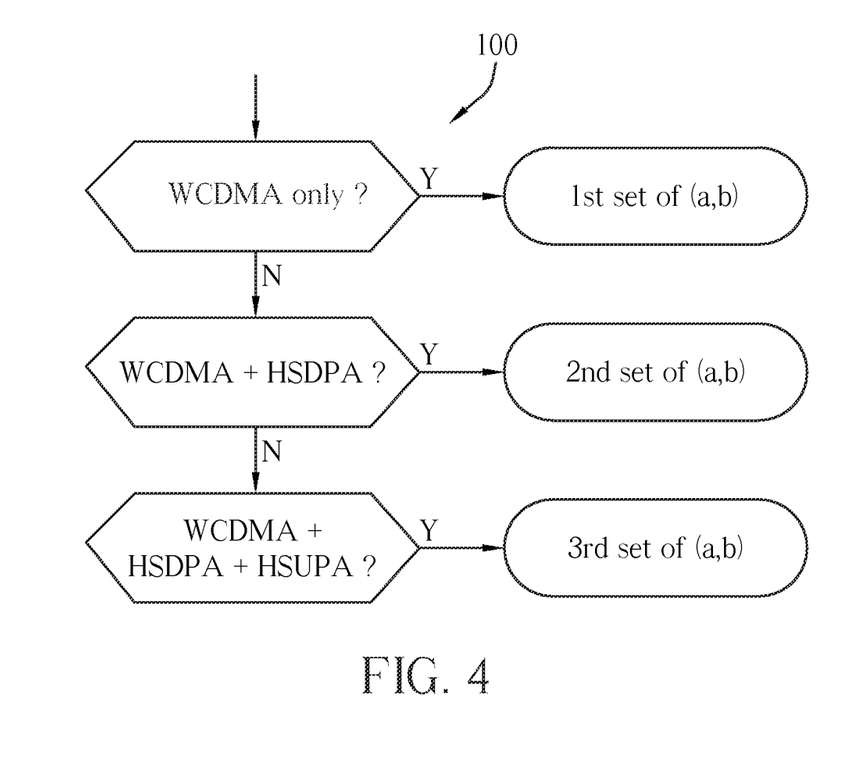
FIG. 4 to FIG. 6 illustrate adjustment selection of the adjustment selector of FIG. 3 according to embodiments of the invention.

The adjustments a and b are provided by an adjustment selector 48, which selects a suitable set of adjustment (a,b) among a plurality of alternatives according to channel configuration and/or other related parameters, such as the spreading factor which indicates how many chips a bit is encoded during spread. In an embodiment, different sets of adjustment (a,b) can be categorized according to protocols/standards adopted for communication. Please refer to FIG. 4 illustrating adjustment selection flow 100 followed by the adjustment selector 48 according to an embodiment of the invention. If the signal is going to be transmitted with channel(s) of WCDMA only, a first set of adjustment (a,b) is selected. If the signal will be transmitted by channel(s) of WCDMA and HSDPA (but not HSUPA), a second set of adjustment (a,b) is selected; and if the signal will be transmitted with channels of WCDMA, HSDPA and HSUPA, a third set of adjustment (a,b) is selected. That is, there are three different sets of adjustment (a,b) respectively suitable for application scenarios of WCDMA only, WCDMA+HSDPA, and WCDMA+HSDPA+HSUPA; and they are selected according to which application scenario is adopted. The flow 100 can be executed when a new value of CM is to be calculated.

Figure 5:
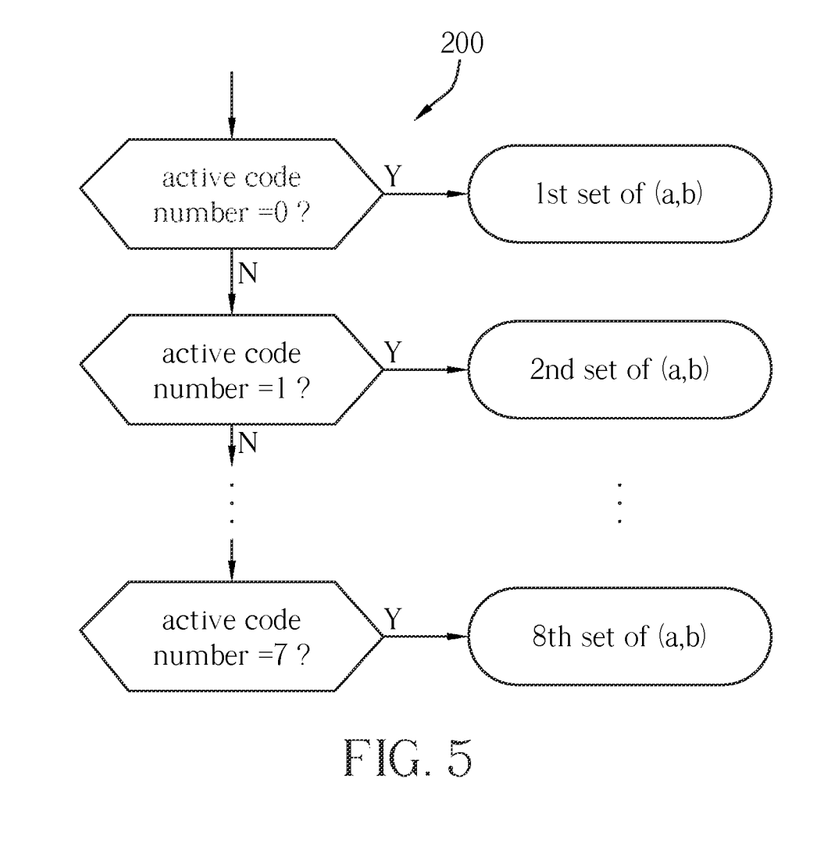

Please refer to FIG. 5 illustrating a second kind of adjustment selection according to an embodiment of the invention. According to active code number, how many channels are used can be known, and the selection can be therefore decided according to number of channels adopted for communication. For example, if the active code number equals 0, select first set of adjustment (a,b); if the active code number is 1, select the second set of adjustment (a,b), etc.

Figure 6:
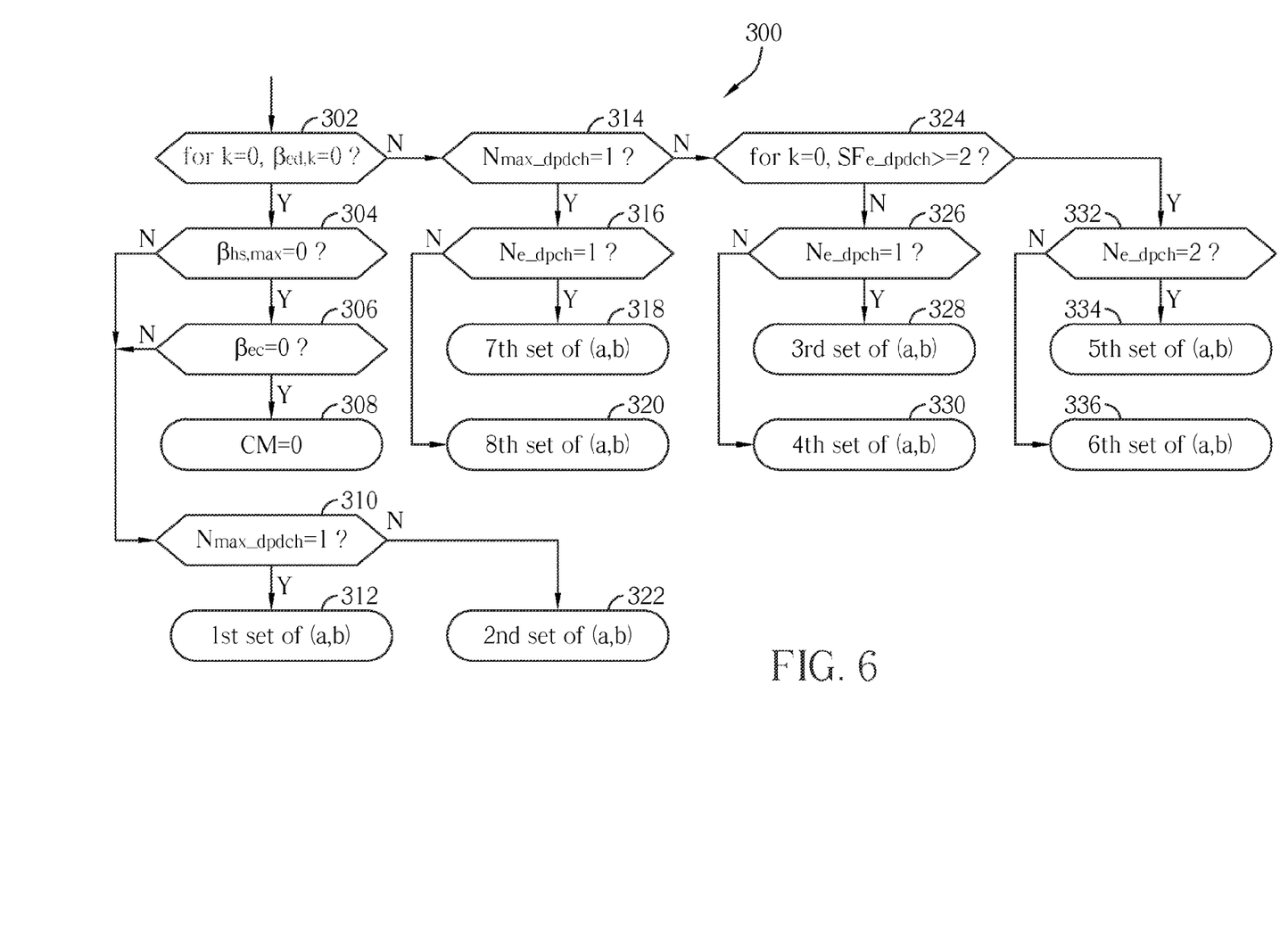

Please refer to FIG. 6 illustrating another adjustment selection flow 300 followed by the adjustment selector 48 according to another embodiment of the invention. Following terminology of WCDMA/HSDPA/HSUPA, the flow 300 includes the following steps.

Step 302: according to whether a corresponding scaling factor equals zero, whether E-DPDCH is not used can be known; if true, proceed to step 304, otherwise go to step 314.

Step 304: according to whether an associated scaling factor equals zero, whether HS-DPCCH is not adopted can be known; if true, proceed to step 306, otherwise go to step 310.

Step 306: according to whether another corresponding scaling factor equals zeros, whether E-DPCCH is not utilized can be known; if true, go to step 308, otherwise go to step 310.

Step 308: directly set the CM to zero since HSDPA and HSUPA are not applied.

Step 310: depending on whether a corresponding parameter is set to 1, whether DPDCH is configured for use can be known; if true, proceed to step 312, otherwise go to step 322.

Step 312: select first set of adjustment (a,b).

Step 314: if DPDCH is configured for use, proceed to step 316, otherwise go to step 324.

Step 316: if number of E-DPDCH is one (i.e., one E-DPDCH is used), proceed to step 318, otherwise go to step 320.

Step 318: select seventh set of adjustment (a,b) for the mapping function 50.

Step 320: select eighth set of adjustment (a,b).

Step 322: select second set of adjustment (a,b).

Step 324: if the spreading factor for the first E-DPDCH is greater than or equal to 2, proceed to step 332, otherwise go to step 326.

Step 326: if only one E-DPDCH is used, go to step 328, otherwise go to step 330.

Step 328: choose third set of adjustment (a,b) for the mapping function 50.

Step 330: choose fourth set of adjustment (a,b).

Step 332: if two E-DPDCHs are used, go to step 334, otherwise go to step 336.

Step 334: select the fifth set of adjustment (a,b).

Step 336: select the sixth set of adjustment (a,b).

The flow 300 demonstrates an adjustment selection considering what kind of channel(s) will be adopted, the number of channels and the spreading factor to be adopted. The adjustment selector 48 can follow either one of the flows 100, 200 and 300 to decide a proper set of adjustment (a,b) for adaptation of different application scenarios. Values of different sets of adjustment (a,b) can be calibrated according to simulation and/or experiment statistics. For example, the metric M3 and associated CM for each application scenario can be evaluated (by simulation and/or experiment), then an M3-to-CM mapping for each scenario can be obtained. Thus, different M3-to-CM mappings can be respectively characterized by different sets of adjustment; and scenarios with similar M3-to-CM mapping can be grouped to share a same set of adjustment. Although a linear mapping is adopted in the embodiment of FIG. 3, other kind of mapping such as a nonlinear mapping can be adopted.

The metric calculation module 36 can be implemented by hardware, firmware and/or software. For example, the transmitter 10 can be controlled by a controller (not shown) which executes program instructions stored in memory (volatile or non-volatile) to implement functions of the metric calculation module 36. Different sets of adjustment (a,b) can be stored as entries of a look-up table. In addition to the metric M3, the power terms can be further generalized to calculate higher order (e.g., n-th order) distortion by a signal metric M(n):

$$\begin{aligned} M(n) &= 20 \cdot \log_{10}((ve_{norm}^n)_{rms}) \\ &= 10 \cdot \log_{10}\left(\frac{E[(rI^2+rQ^2)^n]}{(E[rI^2+rQ^2])^n}\right) \\ &= 10 \cdot \log_{10}(E[(rI^2+rQ^2)^n]) - 10 \cdot \log_{10}((E[rI^2+rQ^2])^n) \\ &= 10 \cdot \log_{10}\left(\frac{1}{2^K}\sum_{i=0}^{2^K-1}A(i)^n\right) - 10 \cdot \log_{10}\left(\left(\frac{1}{2^K}\sum_{i=0}^{2^K-1}A(i)\right)^n\right). \end{aligned}$$

That is, the metric M(n) can be computed according to a sum of n-th power of each power term, and n-th power of a sum of the power terms. In some kind of PA, the effect of higher order distortion is well modeled, and its performance can be better controlled with knowledge of higher order metric M(n).

To sum up, rather than computing the CM by calculation of temporal integration, the invention manages to evaluate the CM according to amplitude combination alternatively, thus the cost and resource (time, power, computation hardware, etc) required for calculating the CM can be effectively reduced. Although terminology of WCDMA/HSDPA/HSUPA is referred for better understanding of aforementioned discussion, the invention can be generalized to transmitters and/or communication systems which need to evaluate nonlinearity metric of signals.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for providing a signal metric by a transmitter, comprising:
   providing a plurality of first phase components by the transmitter; wherein each of the plurality of first phase components equals to a sum of a plurality of corresponding first channel components, and the plurality of first phase components are one of in-phase components and quadrature-phase components, wherein each first channel component corresponds to a product of one of a plurality of symbol amplitudes and one of a plurality of scaling factors, and the plurality of symbol amplitudes correspond to a plurality of constellation mappings of a modulation type, and each first channel component corresponds to a different channel of a plurality of channels corresponding to one of the plurality of first phase components;
   providing each of a plurality of power terms according to a corresponding one of the plurality of first phase components by the transmitter, and
   calculating the signal metric according to the plurality of power terms by the transmitter.

2. The method as claimed in claim 1 further comprising:
   providing each of a plurality of second phase components by the transmitter; wherein each of the plurality of second phase components equals to a sum of a plurality of corresponding second channel components, and the plurality of second phase components are the other of in-phase components and quadrature-phase components, wherein each second channel component corresponds to a product of one of the plurality of symbol amplitudes and one of the plurality of scaling factors; and each second channel component corresponds to a different channel of a plurality of channels corresponding to one of the plurality of second phase component;
   wherein the step of providing each of the plurality of power terms according to a corresponding one of the plurality of first phase components comprising: providing each of the plurality of power terms according to the corresponding one of the plurality of first phase components and a corresponding one of the plurality of second phase components.

3. The method as claimed in claim 2 further comprising:
   providing each of the plurality of power terms according to the corresponding one of the plurality of first phase components and a corresponding one of the plurality of second phase components comprising:
   providing each of the plurality of power terms according to a sum of a square of the corresponding one of the plurality of first phase components and a square of the corresponding one of the plurality of second phase components.

4. The method as claimed in claim 3 further comprising: for each of the power terms, providing each of a first number of first channel components and a second number of second channel components according to the product of one of the plurality of symbol amplitudes and one of a plurality of scaling factors.

5. The method as claimed in claim 1 further comprising: calculating the signal metric according to a sum of n-th power of each power term.

6. The method as claimed in claim 1 further comprising: calculating the signal metric according to n-th power of a sum of the power terms.

7. The method as claimed in claim 1 further comprising: weighting the signal metric by an adjusting gain.

8. The method as claimed in claim 7 further comprising: determining the adjusting gain according to configuration of transmitting channels.

9. The method as claimed in claim 7, wherein the transmitter transmits according to a parameter selected from a plurality of parameters, and the method further comprising: determining the adjusting gain according to the selected parameter.

10. The method as claimed in claim 1 further comprising: offsetting the signal metric by an adjusting offset.

11. The method as claimed in claim 10 further comprising: determining the adjusting offset according to configuration of transmitting channels.

12. The method as claimed in claim 10, wherein the transmitter transmits according to a parameter selected from a plurality of parameters, and the method further comprising:
determining the adjusting offset according to the selected parameter.

13. An apparatus providing a signal metric by a transmitter, comprising:
an accumulation module, implemented by the transmitter, for providing a plurality of first phase components; wherein each of the plurality of first phase component equals to a sum of a plurality of corresponding first channel components, and the plurality of first phase components are one of in-phase components and quadrature-phase components, and each first channel component corresponding to a product of one of a plurality of symbol amplitudes and one of a plurality of scaling factors, and the plurality of symbol amplitudes correspond to a plurality of constellation mappings of a modulation type, and each first channel component corresponds to a different channel of a plurality of channels corresponding to one of the plurality of first phase components; and
a calculation unit obtaining each of a plurality of power terms according to a corresponding one of the plurality of first phase components and calculating the signal metric according to the plurality of power terms.

14. The apparatus as claimed in claim 13, the accumulation module comprising:
a first phase module and a second phase module; for each of the power terms, the first phase module providing each of the plurality of first phase components, and the second phase module providing each of a plurality of second phase components, wherein each of the plurality of second phase component equals to a sum of a plurality of corresponding second channel components, and the plurality of second phase component are another kind components of in-phase components and quadrature-phase components, wherein each second channel component corresponds to a product of one of a plurality of symbol amplitudes and one of a plurality of scaling factors, and each second channel component corresponds to a different channel of a plurality of channels corresponding to one of the plurality of second phase component;
and the calculation unit further obtaining each of the plurality of power terms according to a sum of a square of the corresponding one of the plurality of first phase components and a corresponding one of the plurality of second phase components.

15. The apparatus as claimed in claim 14,
the first phase module further, for each of the power terms, providing a first number of first channel components, and the corresponding first phase component equals to a sum of the first number of first channel components; and
the second phase module further, for each of the power terms, providing a second number of second channel components, and the corresponding second phase component equals to a sum of the second number of second channel components.

16. The apparatus as claimed in claim 15,
the first phase module further, for each of the power terms, providing each of the first number of first channel components according to the product of one of the plurality of symbol amplitudes and one of the plurality of scaling factors, and
the second phase module further, for each of the power terms, providing each of second number of second channel components according to the product of one of the plurality of symbol amplitudes and one of the plurality of scaling factors.

17. The apparatus as claimed in claim 13, wherein the calculation unit further calculates the signal metric according to a sum of n-th power of each power term.

18. The apparatus as claimed in claim 13, wherein the calculation unit further calculates the signal metric according to n-th power of a sum of the power terms.

19. The apparatus as claimed in claim 13 further comprising a mapping unit weighting the signal metric by an adjusting gain.

20. The apparatus as claimed in claim 19, the mapping unit further determining the adjusting gain according to configuration of transmitting channels.

21. The apparatus as claimed in claim 19,
wherein the transmitter transmits according to a parameter selected from a plurality of parameters, and the mapping unit further determining the adjusting gain according to the selected parameter.

22. The apparatus as claimed in claim 13 further comprising a mapping unit offsetting the signal metric by an adjusting offset.

23. The apparatus as claimed in claim 22, and the mapping unit further determining the adjusting offset according to configuration of transmitting channels.

24. The apparatus as claimed in claim 22, wherein the transmitter transmits according to a parameter selected from a plurality of parameters; and the mapping unit further determining the adjusting offset according to the selected parameter.

* * * * *